United States Patent [19]
Joerg et al.

[11] Patent Number: 5,655,620
[45] Date of Patent: Aug. 12, 1997

[54] SERVO-ASSISTED RACK-AND-PINION STEERING SYSTEM

[75] Inventors: Wolfgang Joerg, Stuttgart; Jaromir Bordovsky, Berglen; Aydogan Cakmaz, Stuttgart; Hubert Heck, Duesseldorf; Arno Roehringer, Ditzingen; Claus Gall, Fellbach; Reinhold Abt, Neuhausen; Rainer Strauss, Kaarst; Karl-Hans Koehler, Wernau, all of Germany

[73] Assignee: Mercedes-Benz AG, Stuttgart, Germany

[21] Appl. No.: 495,999

[22] Filed: Jun. 28, 1995

[30] Foreign Application Priority Data

Jun. 28, 1994 [DE] Germany ............ 44 22 555.5

[51] Int. Cl.$^6$ .................................... B62D 5/00
[52] U.S. Cl. .................................... 180/428; 91/375 R
[58] Field of Search ......................... 180/417, 428, 180/444, 147, 148; 74/388 PS, 498; 91/380, 382, 375 R

[56] References Cited

U.S. PATENT DOCUMENTS

| | | | |
|---|---|---|---|
| 3,885,456 | 5/1975 | Forster et al. ............ | 91/380 |
| 3,948,050 | 4/1976 | Kervagoret ............ | 180/428 |
| 4,299,302 | 11/1981 | Nishikawa et al. ............ | 74/498 |
| 4,377,217 | 3/1983 | Nishikawa et al. ............ | 180/428 |
| 4,401,180 | 8/1983 | Nishikawa et al. ............ | 180/428 |

FOREIGN PATENT DOCUMENTS

| | | |
|---|---|---|
| 0249315 | 12/1987 | European Pat. Off. . |
| 0291155 | 11/1988 | European Pat. Off. . |
| 811980 | 4/1959 | United Kingdom ............ 180/147 |
| 2034263A | 4/1980 | United Kingdom . |

*Primary Examiner*—Brian L. Johnson
*Assistant Examiner*—Gary Savitt
*Attorney, Agent, or Firm*—Evenson McKeown Edwards & Lenahan, PLLC

[57] ABSTRACT

A servo-assisted rack-and-pinion steering system is provided in which the rack cooperates with a rotatable pinion. The pinion is supported in an eccentrically located opening in a circular disk rotatably mounted by rolling elements on its periphery. Pivoting movement of the pinion controls an hydraulic oil actuated servo motor. The rolling contact bearing of the disk lies in the path of flow of the hydraulic oil for the servo motor. The pinion is supported in a bearing in the opening in the disk and another bearing at an opposite side of the rack and separate from the disk.

5 Claims, 3 Drawing Sheets

SERVO-ASSISTED RACK-AND-PINION STEERING SYSTEM

BACKGROUND AND SUMMARY OF THE INVENTION

The invention relates to a servo-assisted rack and-pinion steering system in which the rack cooperates with a pinion which at one axial end is mounted for limited movement in the direction of the longitudinal axis of the rack, the radial pinion bearing associated with this axial end being arranged in a bearing part which is pivotable about a stationary axis spaced apart from the pinion axis, this pivoting movement controlling the servomotor or control elements for the latter.

A rack-and-pinion steering system of this kind is the subject of EP 02 49 315 A2. The bearing part is here in the form of a one-armed lever pivotally arranged on a stationary axis. The radial bearing of the pinion on the lever side is arranged in the middle region of said lever. By means of the free end of the lever a hydraulic servo valve arrangement for a hydraulic servomotor is controlled.

In another rack-and-pinion steering system, known from EP 02 91 155 A2, the pinion bearings are arranged on one arm of a two-armed lever, the other arm of which controls a servo valve arrangement.

These known designs are relatively expensive.

SUMMARY OF THE INVENTION

An object of the invention is therefore that of providing a design which is as space-saving and simple as possible.

According to the invention this object is achieved in that the bearing part is in the form of an eccentric disc which has a circular periphery and is rotatably mounted by rolling elements rolling on its periphery, and in that the pinion is mounted in an eccentric axial bore in the eccentric disc.

Since in the case of the invention the radial bearing of the pinion on the eccentric disc side is arranged radially inside the pivot bearing of the eccentric disc, relatively considerable space is available for both bearings even when overall dimensions are small, so that all in all a sturdy, stable mounting with slight friction can easily be achieved.

In addition, it is advantageous that the axis of rotation of the eccentric disc and the pinion axis can be arranged relatively close to one another, with the advantageous consequence that on the one hand the length of the sideways movements of the pinion in the direction of the longitudinal axis of the rack is limited, and on the other hand comparatively large angles of rotation of the eccentric disc occur and can be used to control the servo-motor or its control elements.

According to a preferred embodiment of the invention, provision is made to form, a beak or the like, on a face of the eccentric disc near its periphery, which beak cooperates with push rods or the like for the actuation of the control elements.

In cases where in the context of a hydraulic servo-motor the control elements are in the form of hydraulic slide valves or other valves, in a particularly preferred manner, provision is made for the hydraulic medium also to be passed, for example via axial ducts in the push rods, through the pivot bearing of the eccentric disc, so that, when oils are used as the hydraulic medium, forced-feed lubrication and easy running of said disc are continuously achieved.

Other objects, advantages and novel features of the present invention will become apparent from the following detailed description of the invention when considered in conjunction with the accompanying drawings.

DETAILED DESCRIPTION OF THE DRAWINGS

In the illustrated embodiment of a vehicle steering system, a pinion 1 is actuated by means of a steering wheel (not shown) with the aid of a steering shaft and cooperates with a rack 2, which in turn controls the steered wheels of a vehicle by means of a steering linkage (not shown), for example track rods.

On the opposite side of the rack 2 to that where the pinion 1 is disposed there is arranged in a basically known manner a push piston 3, which is pressed by spring force against the rack 2 and which urges the rack 2 against the pinion 1, thereby maintaining the driving connection between the pinion 1 and the rack 2 without play.

Figure 1:
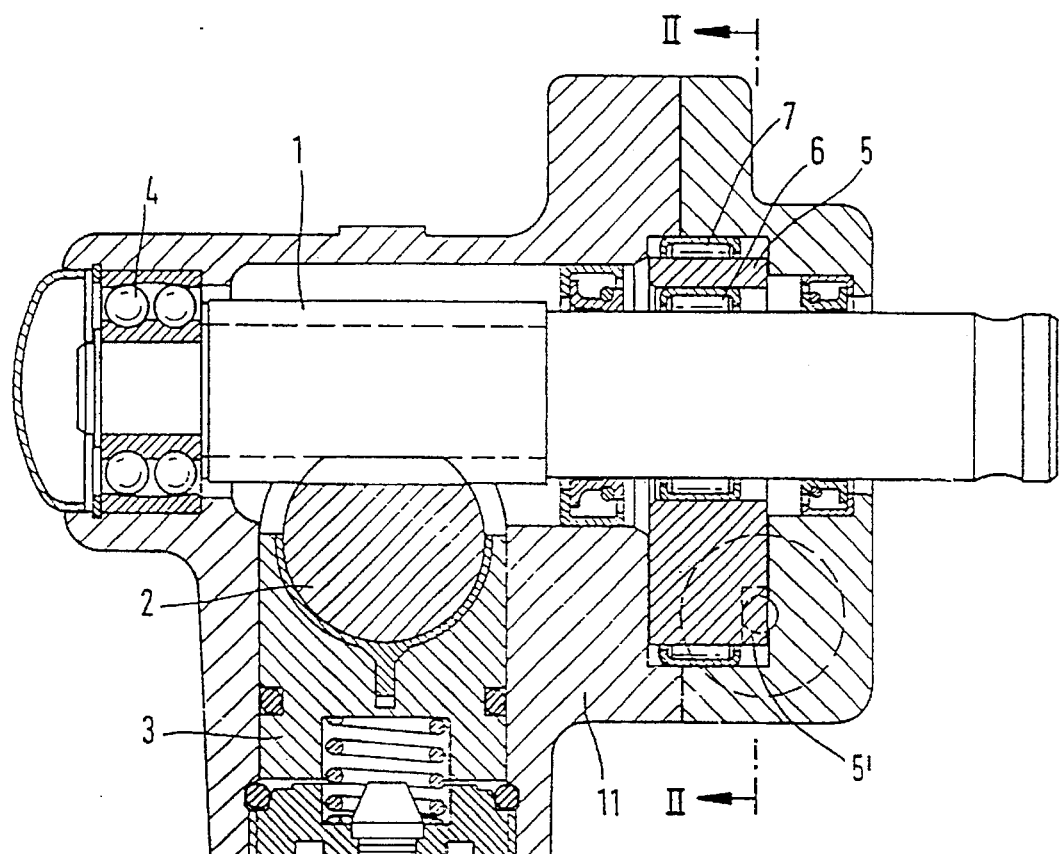
FIG. 1 is a sectional illustration of a rack and-pinion steering system, in which the axis of the pinion lies in the sectional plane directed transversely to the rack, constructed according to a preferred embodiment of the invention.

In FIG. 1 the pinion 1 is mounted radially at its left end in a self-aligning bearing 4. The other axial end of the pinion 1 is provided with a bearing 6 which is arranged in an eccentric disc 5 and which is received in an axial bore formed in the eccentric disc 5 and arranged eccentrically to the center axis of the eccentric disc 5.

The eccentric disc 5 is rotatably mounted by means of a rolling-contact bearing 7 whose rolling elements roll on the circular periphery of the eccentric disc 5.

On that face of the eccentric disc 5 which lies on the right in FIG. 1 a beak 5' is arranged near the periphery of the disc, lying diametrically opposite the axis of the pinion 1 relative to the center of the disc. This beak 5' cooperates with actuating push rods 8 of valve cartridges 9 serving to control a hydraulic servo motor (not shown).

Hydraulic medium flowing back in this arrangement to a tank (not shown) for hydraulic medium is conducted via axial ducts in the actuating push rods 8 through the rolling-contact bearing 7 to a connection 10 in a casing 11 containing the valve cartridges 9 and the rolling contact bearing 7.

The arrangement illustrated in FIGS. 1 and 2 functions as follows:

When forces are transmitted between the pinion 1 and the rack 2, a force acts by constraint on the pinion 1 in the longitudinal direction of the rack 2, so that the pinion 1 is pushed sideways. Because of the arrangement of the one bearing 6 in the eccentric disc 5, the pinion 1 then makes a certain sideways movement, turning the eccentric disc 5, the direction of this movement being in each case dependent on the direction of the forces transmitted between the pinion 1 and the rack 2, and accordingly on the direction of a torque acting on the pinion 1.

Figure 2:
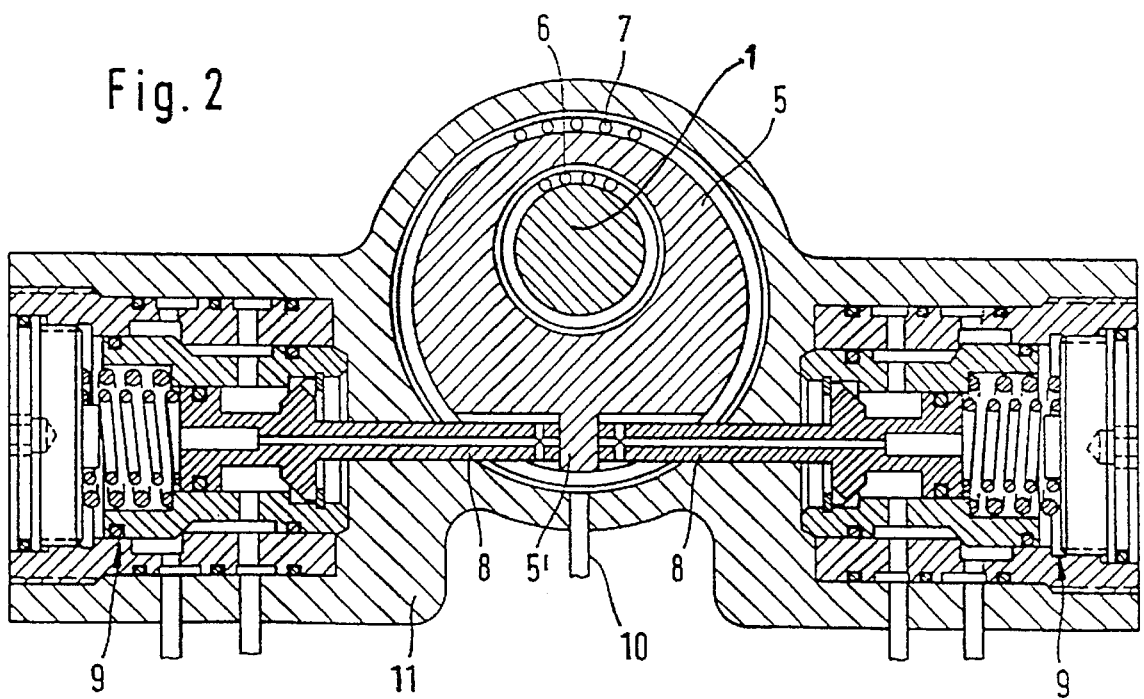
FIG. 2 is a sectional view taken along sectional line II—II in FIG. 1.

The turning movement of the eccentric disc 5 accompanying the sideways movement of the pinion actuates, via the beak 5' of the eccentric disc, the actuating push rod 8, on the right or left in FIG. 2, of the valve cartridges 9, so that the servomotor (not shown) accordingly produces a force in one direction or the other.

Figure 3:
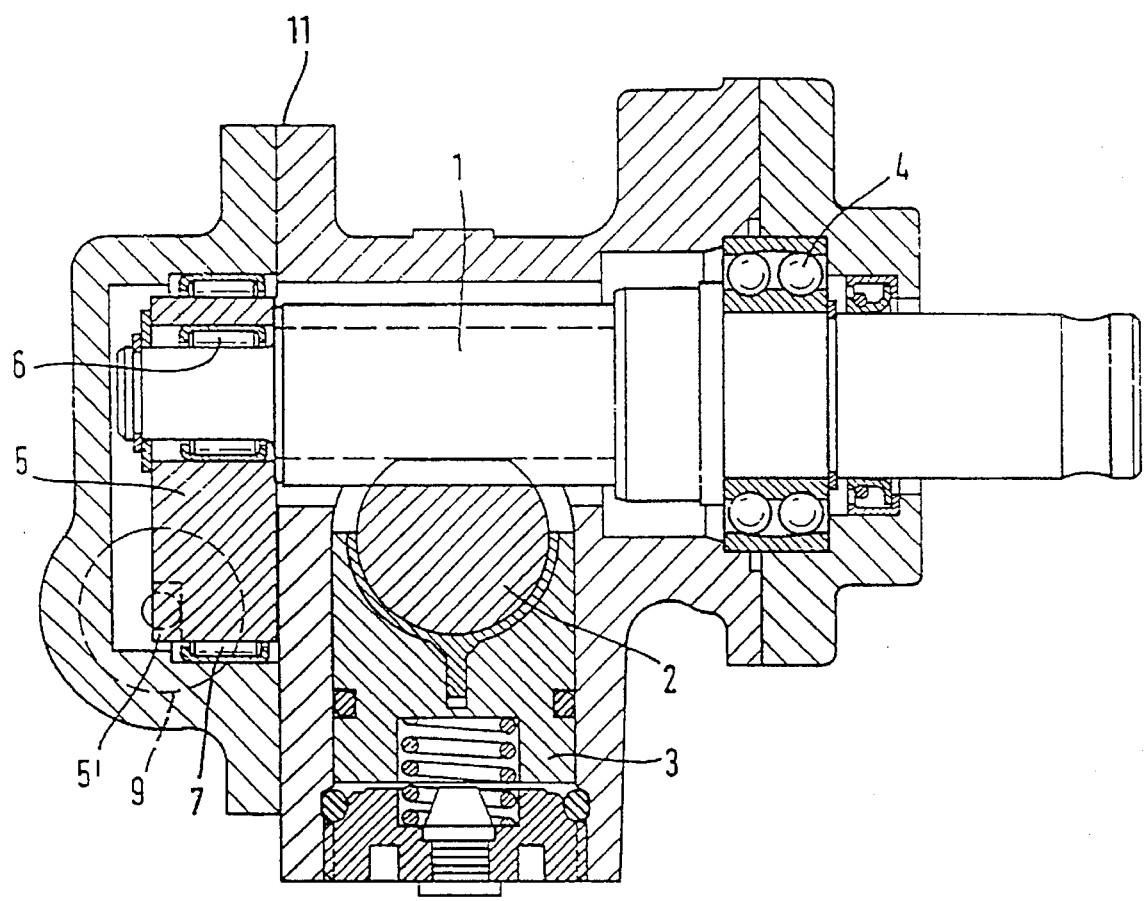
FIG. 3 is a view similar to FIG. 1, showing another preferred embodiment of the invention.

The embodiment illustrated in FIG. 3 differs from the embodiment according to FIG. 1 essentially only in that the positions in which the self-aligning bearing 4 and the eccentric disc 5 are installed have been transposed, while the arrangement of the valve cartridges 9 has also been changed in accordance with the arrangement of the eccentric disc 5.

Figure 4:
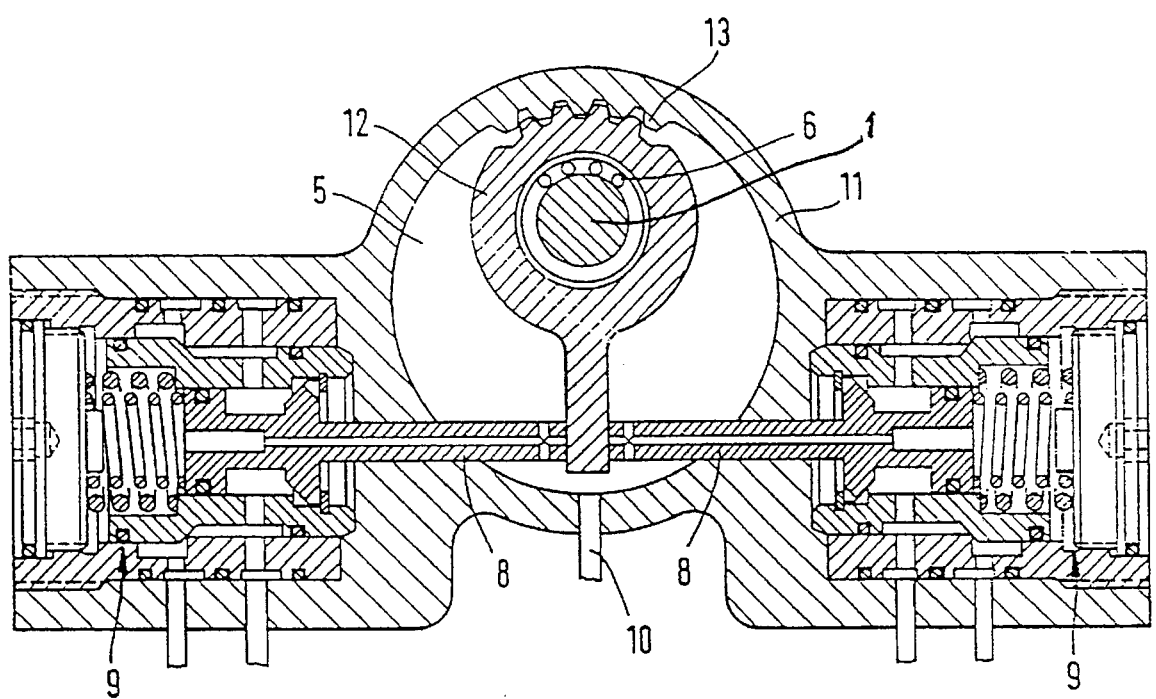
FIG. 4 is a view similar to FIG. 2, showing a preferred embodiment of the invention.

As shown in FIG. 4, a rocking lever 12 can be arranged on the axis of the pinion 1 passing through the bearing 6 in the eccentric disc 5, that part of said lever which surrounds the pinion axis having a configuration after the style of a gear which, when the eccentric disc 5 makes rotational movements, rolls in a circular or circular arc-shaped internal toothing 13 in the casing 11.

That end of the rocking lever 12 which actuates the actuating push rods 8 of the valve cartridges 9 makes comparatively large adjustment strokes when the eccentric disc 5 makes rotational movements, so that valves having long adjustment distances can be used.

In the embodiment shown in FIG. 4 the eccentric disc 5 may optionally be omitted, so that the pinion 1 is mounted at the one axial end solely in the rocking lever 12.

What is claimed is:

1. Servo-assisted rack-and-pinion steering system in which a rack cooperates with a pinion which at one axial end is mounted for limited movement in a direction of a longitudinal axis of the rack, a radial pinion bearing associated with this axial end which is arranged in a bearing part which is pivotable about an axis spaced apart from a pinion axis, this pivoting movement controlling a servomotor, wherein the bearing part is in the form of an eccentric member which has a circular periphery and is rotatably mounted by rolling elements rolling on its periphery, wherein the pinion is mounted in an eccentric axial bore in the eccentric member, wherein the control elements include a hydraulic servomotor operated by hydraulic oil, and wherein a rolling-contact bearing of the eccentric member lies in the path of flow of the hydraulic oil.

2. Rack-and-pinion steering system according to claim 1, wherein said eccentric member is an eccentric disk with a beak which cooperates with push rods actuating the servo motor.

3. Servo-assisted rack-and-pinion steering system comprising:

a housing, a pinion having a pinion axis, a toothed rack extending transversely of said pinion and operably engaged by teeth on said pinion to be moved axially in response to rotative movement of the pinion, first and second axially spaced bearings rotatably supporting the pinion in said housing at respective opposite sides of said rack, a circular disk which is rotatably supported by a third bearing along its circular periphery at said housing at one side of and spaced from said rack, said first bearing being disposed in an eccentric axial bore of said disk such that reaction forces between said rack and pinion result in rotational movement of said disk, said second bearing being disposed in the housing spaced from and separate from the disk, said disk carrying an actuation part operable to control a servo-assist mechanism.

4. Rack-and-pinion steering system according to claim 3, wherein said actuation part is a radially extending beak which cooperates with push rods actuating the servo-assist mechanism.

5. Rack-and-pinion steering system according to claim 3, wherein the servo-assist mechanism includes a hydraulic servo motor operated by hydraulic oil, and wherein the third bearing lies in the path of flow of the hydraulic oil operating the hydraulic servo motor.

* * * * *